J. H. ADAMS.
AUTOMOBILE HEADLIGHT.
APPLICATION FILED FEB. 18, 1911.
1,004,953.
Patented Oct. 3, 1911.
2 SHEETS—SHEET 1.
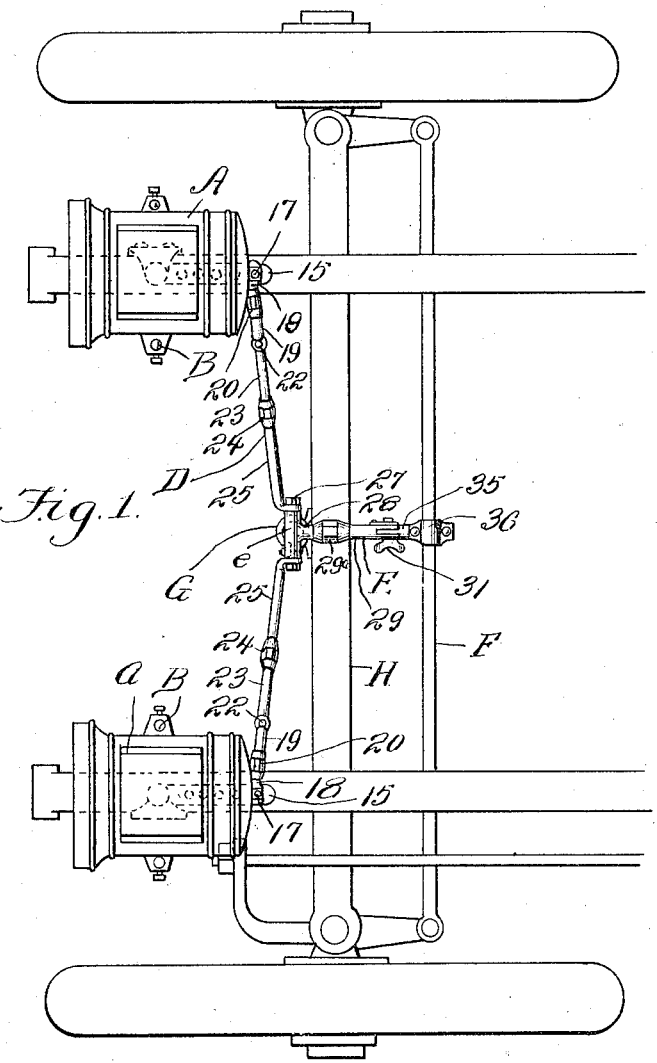
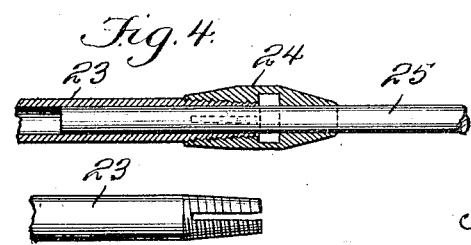
Witnesses
J. L. Wright
U. B. Hillyard
Inventor
John H. Adams,
By Victor J. Evans
Attorney

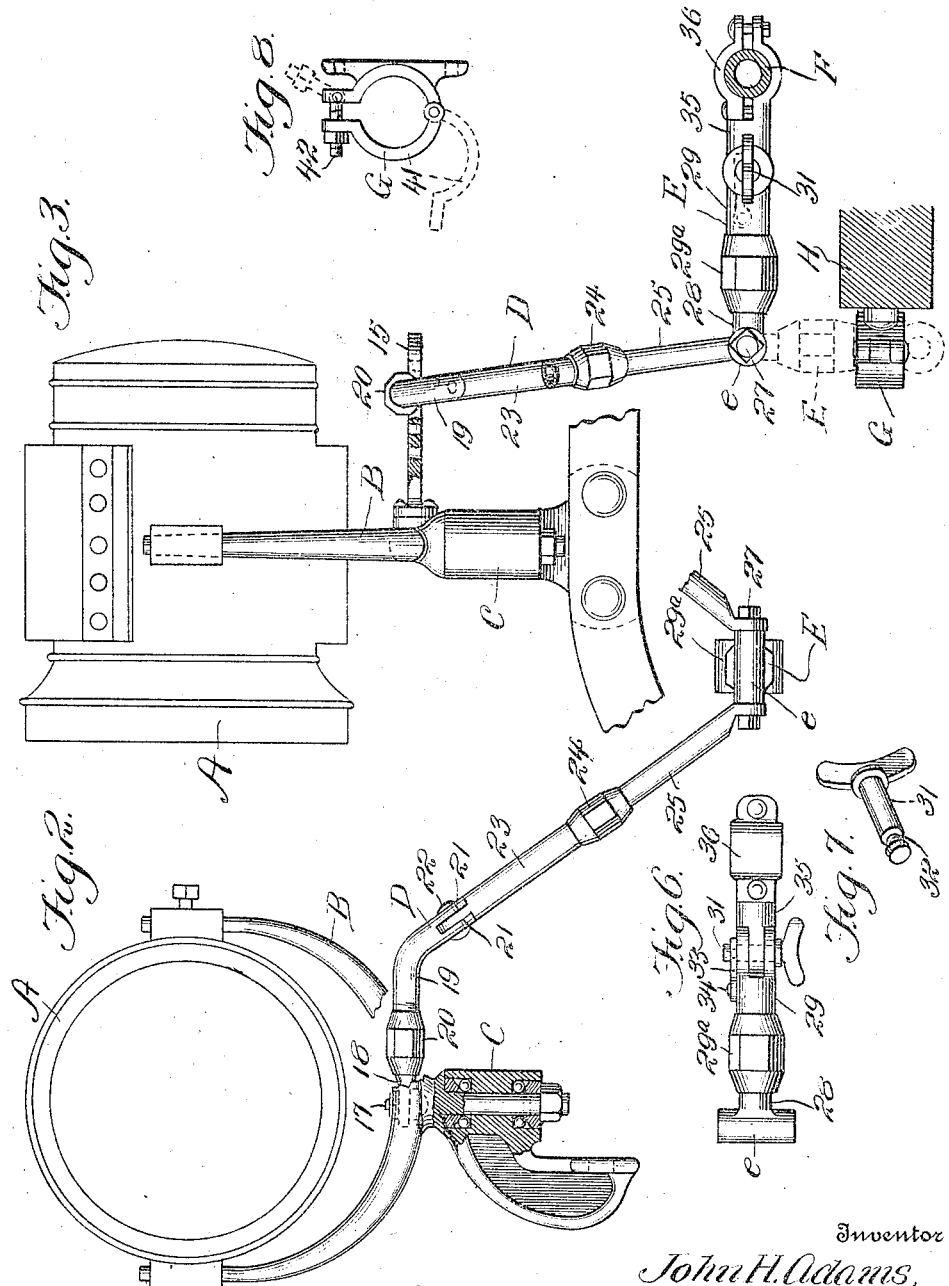

UNITED STATES PATENT OFFICE.

JOHN H. ADAMS, OF NEW HAVEN, CONNECTICUT.

AUTOMOBILE-HEADLIGHT.

1,004,953.   Specification of Letters Patent.   Patented Oct. 3, 1911.

Application filed February 18, 1911. Serial No. 609,283.

*To all whom it may concern:*

Be it known that I, JOHN H. ADAMS, a citizen of the United States, residing at New Haven, in the county of New Haven and State of Connecticut, have invented new and useful Improvements in Automobile-Headlights, of which the following is a specification.

The present invention provides mountings and connections whereby headlights may be readily adapted to different makes of automobiles when it is required to equip such machines with moving lamps adjustable with the steering wheels so as to throw the light in the direction of travel, whereby the roadway may be illuminated in advance of the machine when turning corners or rounding curves, the connections also admitting of throwing the lamps out of action during daylight or at such times when it is not required to have the lamps connected with the steering mechanism for movement therewith.

The invention consists of the novel features, details of construction and combination of parts, which hereinafter will be more particularly set forth, illustrated in the accompanying drawings, and pointed out in the appended claims.

Referring to the drawings, forming a part of the specification, Figure 1 is a top plan view of the front portion of an automobile provided with headlights embodying the invention. Fig. 2 is a front view of one of the lamps and connections. Fig. 3 is a side view of the parts illustrated in Fig. 2. Fig. 4 is a detail view in section of the joint formed between adjustable sections of the variable connections. Fig. 5 is a detail view of one of the parts forming an element of the joint between the members of an adjustable connection. Fig. 6 is a top plan view of the connection between the steering rod and the connections extending to the lamp bracket. Fig. 7 is a detail view in perspective of the fastening between the sections of the connection between the steering rod and the lamp bracket connections. Fig. 8 is a detail view of the clip applied to the axle for supporting the section of the steering rod connection when separated.

Corresponding and like parts are referred to in the following description, and indicated in all the views of the drawings, by the same reference charcaters.

The lamps or headlights are indicated at A and B are the brackets for supporting the same, said brackets being of usual formation embodying a fork and a stem. The lamp brackets B are mounted in brackets C attached to the frame of the machine so as to turn about their stems as vertical axes. Ball bearings are provided between the brackets B and C to reduce the friction to the smallest amount possible. Arms 15 project rearwardly from the lamp brackets B and are bolted or otherwise secured thereto and have a series of openings in their length to admit of the connections between the lamp brackets and connecting rod having adjustable connection with the said arms 15. The connections embody parts designated by the reference letters D and E, each of said connections comprising a plurality of sections which are adjustably connected to admit of varying the length of the connections to meet existing conditions in the installation or adaptation of the invention to an automobile. Each of the connections D comprises sections 18, 19, 23 and 25, the sections 18 and 19 and 23 and 25 being adjustably connected to admit of variation in their length. The joints between the sections 18 and 19 and 23 and 25 are similar, adjacent sections having a telescopic connection and the outer section being slotted and having its end tapered and threaded to receive the threaded end of a coupling sleeve, which threaded end tapers to correspond with the taper of the slotted section so that when tightening the sleeve the parts of the sections separated by the slots are contracted and caused to grip the inner end of the mating section and thereby secure the sections in the adjusted position. The sections 18 and 19 are connected by means of a coupling sleeve 20 and the sections 23 and 25 are joined by means of a coupling sleeve 24. The section 18 is connected to the arm 15 by means of a bolt or fastening 17, which passes through one of the series of openings in the arm 15, said section turning on the bolt 17. It will thus be understood that the bolt 17 serves both to pivotally and adjustably connect the section 18 with the arm 15. The section 19 is bent between its ends and has a pivot connection with the section 23, the sections having overlapping parts 21 through which a pivot fastening 22 passes.

The connection E comprises sections 28, 29 and 35, the sections 28 and 29 being adjustably connected by means of a coupling sleeve 29ª in substantially the same manner as the sections 18 and 19 and 23 and 25. The section 28 has a horizontal sleeve *e* through which a bolt or fastening 27 passes, said bolt serving to pivotally connect the sections 25 of the connections D with the part *e*. The section 35 has a clip 36, which is adapted to grip the connecting rod F between the arms of the steering knuckles of the steering wheels. The sections 29 and 35 are detachably connected by means of a fastening 31, which passes through registering openings formed in overlapping parts, said fastening having an annular groove 32 near one end to receive a latch 33, which is pivoted at 34 to the section 29. Upon moving the latch 33 to clear the groove 32 the fastening 31 may be withdrawn and the section 29 disconnected from the section 35, thereby throwing the headlights or lamps out of operation so far as movement with the steering gear is concerned. When the section 29 is disconnected from the section 35 it is retained in place by means of a clip G secured centrally to the front axle H. The clip G comprises a base portion and a pivoted part 41, the latter being secured at its free end to the base portion by means of a pivoted bolt 42.

When the parts are assembled and in proper working position movement of the connecting rod F to steer the machine causes a corresponding movement of the connection E, which is transmitted to the lamp brackets B by means of the connections D and arms 15. The pivot joints between the sections 19 and 23 and D and E provide for variations in the distance between the connecting rod F and the arms 15. The pivots being approximately horizontal enable the sections to swing thereon in one direction, but to move laterally so as to turn the lamp brackets about their stems. The pivot connections 17 provide for change of angle between the arms 15 and the connections. The adjustable telescopic joints between the sections of the several connections provide for variation in length so that the invention as a whole may be readily adapted to different makes of machines.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In an automobile headlight, the combination of a clip applied to the axle, a lamp bracket mounted to turn about a vertical axis, a connection between the lamp bracket and rod connecting the arms of the steering knuckles, said connection comprising separable parts, one of which is adapted to be supported in the aforesaid clip when disconnected from the other part, and a fastening for detachably connecting the parts of the connection.

2. In an automobile headlight the combination of two lamp brackets mounted upon opposite sides of the machine to turn about vertical axes, a connection comprising two sections having detachable connection, one of the sections being secured to the rod connecting the arms of the steering knuckles, other connections between the other section and the lamp brackets, and a clip secured to the axle and adapted to receive and support the section of the first mentioned connection when the sections are separated to throw the lamps out of operation with the steering mechanism.

3. In an automobile headlight, the combination of a lamp bracket mounted to turn about a vertical axis, an arm projected horizontally from the lamp bracket, a connection having pivotal and adjustable attachment with said arms and comprising sections which are pivotally and adjustably connected, a second connection pivotally joined to the first mentioned connection and attached to the rod between the arms of the steering knuckles, said second connection comprising sections which are adjustably and detachably joined, and a holder for receiving the section of the second connection when detached from its companion section.

In testimony whereof I affix my signature in presence of two witnesses.

JOHN H. ADAMS.

Witnesses:
 EDWARD THOMPSON,
 VINCENT TERARDI.